US008401891B2

(12) United States Patent
Macy et al.

(10) Patent No.: US 8,401,891 B2
(45) Date of Patent: Mar. 19, 2013

(54) EVALUATION OF A BUSINESS CASE BASED ON THE COST OF POOR PROCESS OPPORTUNITIES

(75) Inventors: Barbara Macy, Charlotte, NC (US); Kenneth R. Dafforn, Charlotte, NC (US); Aline Young, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1521 days.

(21) Appl. No.: 11/160,935

(22) Filed: Jul. 15, 2005

(65) Prior Publication Data
US 2006/0100890 A1 May 11, 2006

Related U.S. Application Data

(60) Provisional application No. 60/522,817, filed on Nov. 10, 2004.

(51) Int. Cl.
*G06Q 10/00* (2006.01)
(52) U.S. Cl. .............. 705/7.38; 705/7.41; 705/7.42; 702/182
(58) Field of Classification Search ........... 705/7–10, 705/7.38, 7.41, 7.42; 702/182
See application file for complete search history.

(56) References Cited

U.S. PATENT DOCUMENTS

| | | | | |
|---|---|---|---|---|
| 5,799,286 | A * | 8/1998 | Morgan et al. | 705/30 |
| 2002/0120486 | A1 * | 8/2002 | Thompson | 705/9 |
| 2002/0133368 | A1 * | 9/2002 | Strutt et al. | 705/1 |
| 2002/0188488 | A1 * | 12/2002 | Hinkle | 705/8 |
| 2004/0260592 | A1 * | 12/2004 | George et al. | 705/8 |
| 2005/0049911 | A1 * | 3/2005 | Engelking et al. | 705/11 |

OTHER PUBLICATIONS

Larry Leach, Schedule and Cost Buffer Sizing: How to Account for the Bias Between Project Performance and Your Model. Project Management Journal (Jun. 2003), pp. 34-47.*
Larry Leach, Schedule and Cost Buffer Sizing: How to Account for the Bias Between Project Performance and Your Model, Project Management Journal, Jun. 2003.*
David Dinell, Banking goes Sig Sigma. Wichita Business Journal. Wichita: Nov. 21, 2003. vol. 18, Iss. 48; p. 20.*

* cited by examiner

*Primary Examiner* — Lynda Jasmin
*Assistant Examiner* — Timothy Padot
(74) *Attorney, Agent, or Firm* — Michael A. Springs; Moore and Van Allen, PLLC; Jeffrey R. Gray

(57) ABSTRACT

Evaluation of a business case based on the cost of poor process opportunities. In at least some embodiments, an evaluation of a cost of poor process opportunity (COPPO) in an "as-is" process can include calculating a cost per step for each of the plurality of steps or tasks in an activity. COPPO can be determined based in part on whether each step or task in a process or activity is a non-value-add step, and also based in part on a cost of poor quality (COPQ) target percentage. In some embodiments a total cost of poor business process relative to a total cost for each of the plurality of steps can be displayed for a user. The COPPO evaluation can further be used to facilitate the evaluation of a business case for a "to-be" process.

11 Claims, 7 Drawing Sheets

FIG. 3A

Cost of Poor Process AS-IS Worksheet — 300

Process Description: — 304

Prepared By: — 306

| Process Steps | Average Hours per Task | Average Rate | Time Leveled | FTE By Step | FTE Cost of Step | NVA | COPQ Target % | Total Cost of Poor Business Process | Total Cost for this step |
|---|---|---|---|---|---|---|---|---|---|
| | | | | | | | | | |
| | | | | | | | | | |
| | | | | | | | | | |
| | | | | | | | | | |
| 308 | 316 | 318 | 322 | 312 | 324 | 326 | 328 | 330 | 334 |

Value Added
- ☐ 1
- ☐ 2
- ☐ 3
- ☐ 4
- ☐ 5 — 310

| FIG. 3A |
| FIG. 3B |

FIG. 4

| As is Process Steps | Cost | To Be Process Steps | Cost | Savings | Initiative Groups | New #'s | $ Per |
|---|---|---|---|---|---|---|---|
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
| Total Opportunity | $0.00 |  | $0.00 | $0.00 |  |  | $0.00 |

402 → As is Process Steps
404 → Cost
406 → To Be Process Steps
408 → Cost
410 → Savings
412 → Initiative Groups / New #'s / $ Per
400 → (table)

EVALUATION OF A BUSINESS CASE BASED ON THE COST OF POOR PROCESS OPPORTUNITIES

CROSS-REFERENCE TO RELATED APPLICATIONS

This application claims priority from provisional patent application Ser. No. 60/522,817 filed Nov. 10, 2004, the entire disclosure of which is incorporated herein by reference.

Some of what is disclosed in this application is also disclosed in co-pending, commonly owned application Ser. No. 10/905,254, filed Dec. 22, 2004, and Ser. No. 10/908,925 filed Jun. 1, 2005, the entire disclosures of which are incorporated herein by reference.

CROSS-REFERENCE TO COMPUTER PROGRAM LISTING APPENDIX

A portion of the present disclosure is contained in a computer program listing appendix. The appendix contains an MS-DOS file entitled COPPO2.txt created on Jun. 23, 2005, of approximately 18 kilobytes. The contents of this file are incorporated herein by reference. Any references to "the appendix" or the like in this specification refer to this file. The contents of this file are subject to copyright protection. The copyright owner has no objection to the reproduction by anyone of the patent document or the appendix as it appears in the Patent and Trademark Office patent files or records, but does not waive any other copyright rights by virtue of this patent application.

BACKGROUND

Understanding how to execute a business process within a company or enterprise in order to maximize revenue, profit, or other metrics, is of enormous importance and has a significant impact on the company's success in the marketplace. Ideally therefore, business processes should be monitored, modeled, and optimized in much the same ways as scientific or manufacturing processes. Thus, the same management tools and methodologies as typically applied to manufacturing processes, for example six sigma and "lean" management techniques, can and should be applied to business processes.

Six sigma is a rigorous and disciplined methodology that uses data and statistical or statistics-like analysis to improve operational performance. The term "sigma" refers a statistical expression of numbers defects per numbers opportunities, with "six sigma" corresponding to 3.4 defects per million. "Lean" is a term used to refer to techniques originally developed in the automobile industry to improve manufacturing performance. Lean and six sigma methodologies can be applied together.

When a business process is being analyzed using either a six sigma or a lean technique (or both) the faster the analysis can be accomplished with accuracy, the sooner the enterprise can reap the benefits. Thus, tools and methods to make the six sigma, lean, or other process being used to improve or operationalize excellence of the business process can be important.

SUMMARY

Embodiments of the present invention describe methods, apparatus, and systems that can help facilitate an expedited six sigma and/or lean methodology. Such a methodology may be referred to herein as "turbolean" and can be used to operationalize business process excellence. The turbolean method includes characterizing current or "as-is" business processes and developing, characterizing, and evaluating "to-be" business processes in a continuous improvement loop. Embodiments of the present invention can facilitate the evaluation of the cost of poor processes in an enterprise, and of the business case for changes.

In at least some embodiments, a method of evaluating a cost of poor process opportunity (COPPO) can include calculating a cost per step for each of the plurality of steps or tasks in an activity. This calculation can include apportioning the time in an accounting period, for example, a year, across all the steps in the process. This calculation takes into account an average time per task and a full time equivalent (FTE) rate and can begin by determining an employee or associate FTE per task or step for each of the steps. In at least some embodiments, a determination is made as to whether each step is a non-value-add (NVA) step. This determination can be made by accepting input from a user or evaluator. If a step is an NVA step, the COPPO for the step is the entire cost of the step. If the step is not an NVA step, the COPPO for the step is determined by multiplying the cost per step by a cost of poor quality (COPQ) target percentage. In some embodiments a total cost of poor business process relative to a total cost for each of the plurality of steps can be displayed for a user. Additionally, in some embodiments, the total activity cost of poor business process can also be displayed. In many embodiments, a COPQ target percentage of 20-40% is used.

In some embodiments, the COPPO evaluation can be used to aid in the evaluation of a business case for a to-be process. In such an embodiment, the COPPO information obtained through the COPPO evaluation of an as-is process can be compared to a COPPO for the to-be process. Additional comparisons can take into account a total to-be cost of poor business process for at least one of the plurality of steps, a total to-be cost per step for at least one of the plurality of steps, the total to-be activity cost of poor business process, and/or the total to-be activity cost.

In some embodiments, the invention is at least in part implemented via either a stand-alone instruction execution platform or such a platform interconnected with other platforms or data stores by a network, such as a corporate intranet, a local area network, or the Internet. A computer program product or computer program products contain computer programs with various instructions to cause the hardware to carry out, at least in part, the methods and processes of the invention. Data stores can include inputs such as FTE rates and COPQ target percentages, outputs of the COPPO and business case processes for use in further efforts at operationalizing process excellence relative to the business process or processes at issue.

BRIEF DESCRIPTION OF THE DRAWINGS

FIGS. 3A and 3B are screenshots of a COPPO input and output screen according to some embodiments of the present invention.

FIG. 4 is a screenshot showing input and output that facilitates the presentation of a business case according to example embodiments of the present invention.

DETAILED DESCRIPTION

The present invention will now be described in terms of specific, example embodiments. It is to be understood that the invention is not limited to the example embodiments disclosed. It should also be understood that not every feature of the systems and methods described is necessary to implement the invention as claimed in any particular one of the appended claims. Various elements, steps, processes, and features of various embodiments of systems, apparatus, and processes are described in order to fully enable the invention. It should also be understood that throughout this disclosure, where a process or method is shown or described, the steps of the method may be performed in any order or simultaneously, unless it is clear from the context that one step depends on another being performed first. Also, time lags between steps can vary.

Figure 1:
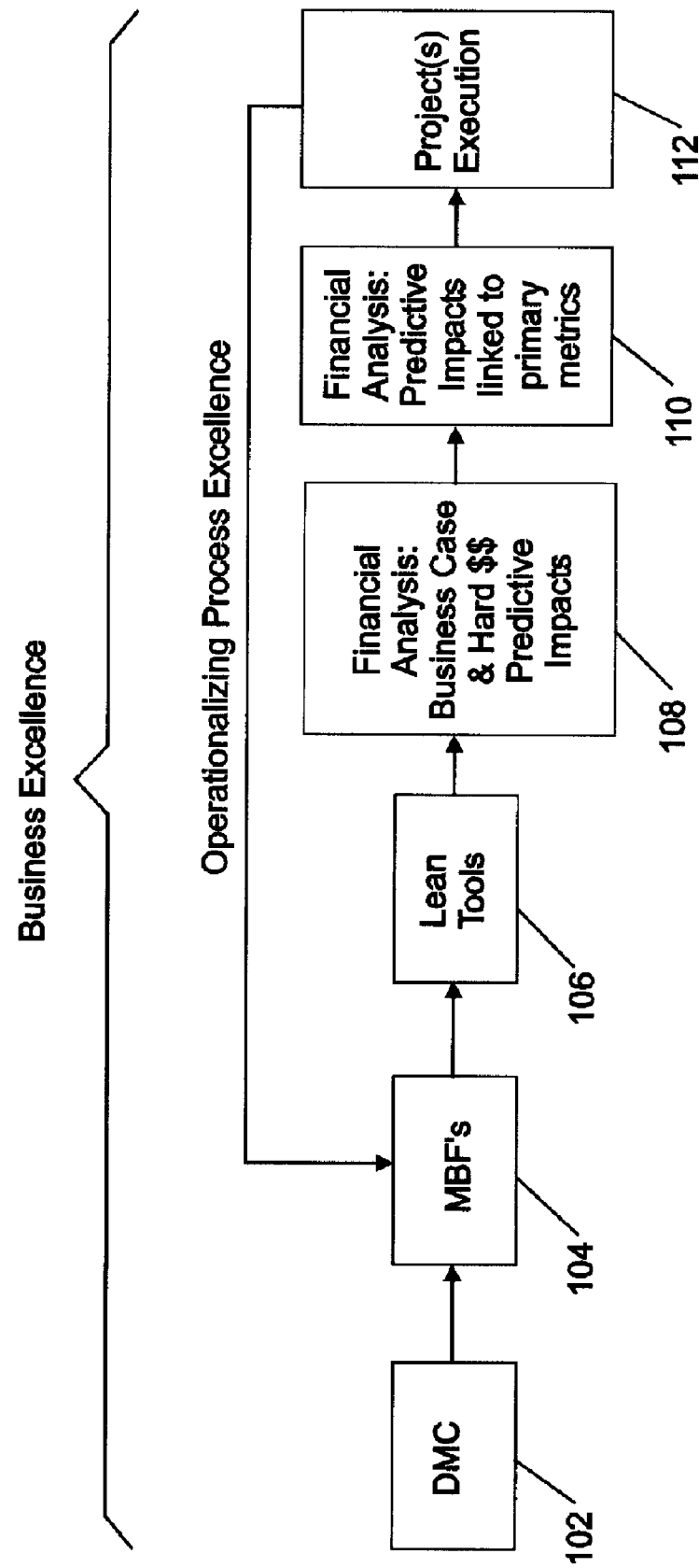
FIG. 1 is a block diagram of an overall system that promotes business excellence, in part through operationalizing process excellence.

FIG. 1 illustrates the operating environment of the invention as a system of related activities represented by system blocks. These activities can be carried out to some extent in parallel and there may be overlap between the activities. The system can be used to enable or operationalize process excellence and may include varying numbers of tools as a part of the process. Portions of the process may be referred to herein as "turbolean." Turbolean can be a 30 to 90 day execution methodology that melds process excellence with six sigma tools and lean tools (which together may be referred to herein as "lean" tools), and may include activity-based financial tools along with an operational efficiency model, to create a continuous improvement productivity loop. The example system of FIG. 1 includes define, measure, and control (DMC) activities 102, and management by fact activities (MBF's) 104.

In block 106 of FIG. 1, lean tools, and possibly other tools are used to produce financial analysis including a business case and hard-cost-related, predictive impacts, as shown at block 108. Subsequently, a financial analysis that includes predictive impacts linked to primary metrics is produced at block 110. Project execution 112 can then be undertaken, which is managed by fact at block 104. This implementation and control can produce a feedback loop that operationalizes process excellence, within an overall system of business excellence system.

Figure 2:
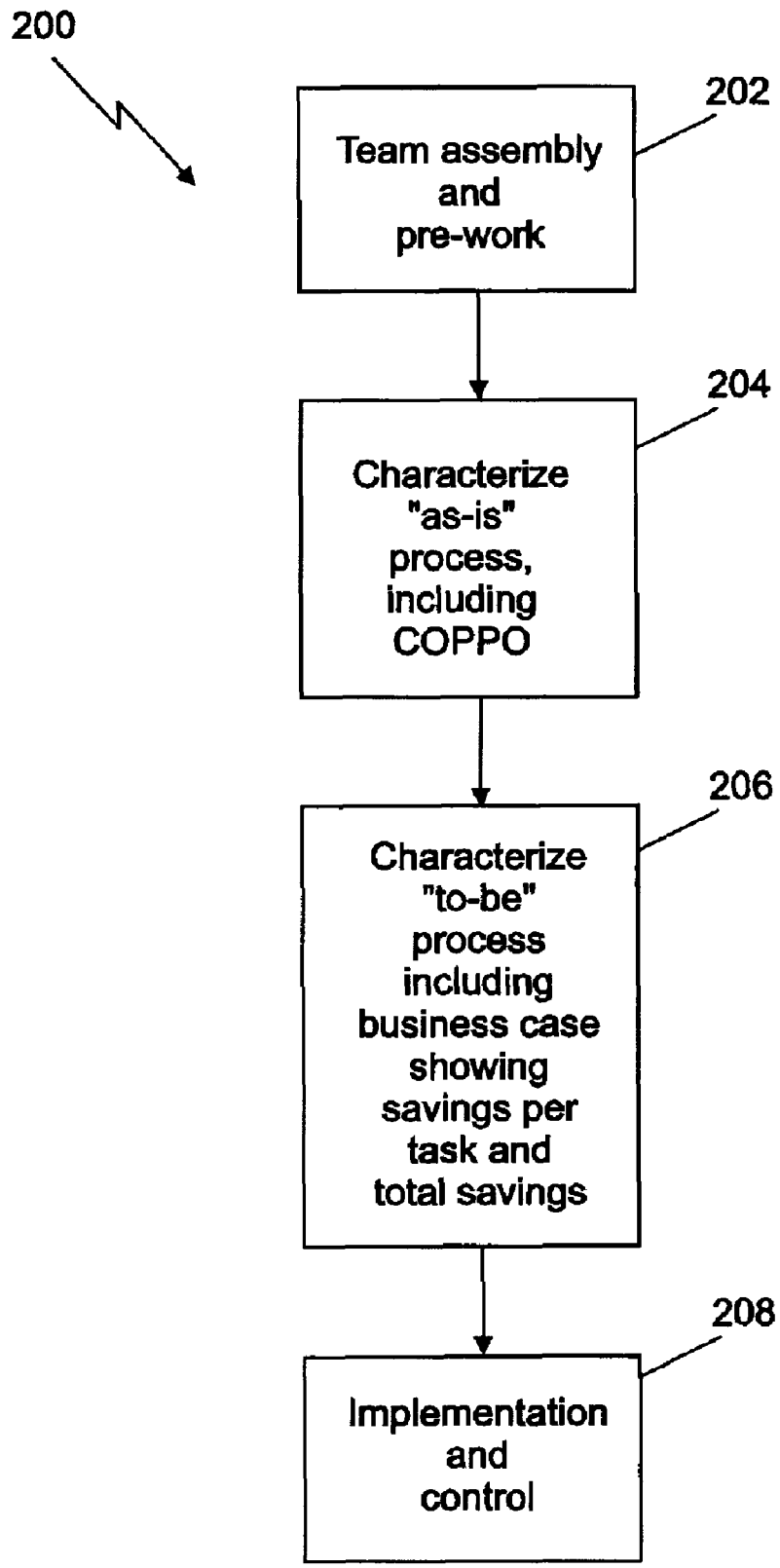
FIG. 2 is a flowchart that illustrates a portion of a method of using lean tools according to embodiments of the invention to operationalize process excellence.

FIG. 2 describes how the tools used in the system of FIG. 1 are applied to produce the financial analysis and implement process improvement. As opposed to the system view of FIG. 1, FIG. 2 is a process view presented in flowchart form, as a series of process blocks. Process 200 of FIG. 2 includes team assembly and pre-work as shown at block 202. Pre-work sessions in some embodiments are those in which products' or services' evolution can be examined and opportunities to reduce completion time, improve delivery time to customers and reduce overall costs can be identified. Tools can be used to characterize an end-to-end flow of the product through the business process. These tools can include kick-off information meeting materials and team member lists. A kick-off meeting can provide an open forum to address questions to the members with respect to the process early so the members are more productive during the team sessions. A performance plan can be developed that incorporates current and future processes and a recommended timeline for tracking the project. The tools used early in pre-work call sessions can include an assessment tool and a performance plan tool, for example, as well as Hoshin planning or other closed-loop performance plan tools to provide a baseline and a progression check of metrics for initiatives. A lean work plan and the member contact list can also be used in the pre-work sessions to document the project tasks, the lean team member(s) assigned a particular task, and task start and completion dates.

In the example of FIG. 2, the as-is process can be characterized at block 204 by determining the impact of changes on the process and on employee views through developing an as-is process map, including a time vs. waste view of the business process. Additional tools used can include a management plan, skills matrix, a voice-of-the-associate (VOA) or employee opinion survey, and a work plan. The work plan can help identify the stakeholders, their reaction to the changes and potential risks. The skills matrix identifies the strengths and weaknesses of team members by ascertaining the gaps to skills needed to complete the project.

A multi-generational plan can be established. The first generation of the plan can set out tasks for vision, process generations, technologies, scope, governance and metrics for tracking project success. The first generation plan can also set out a generation task timeline. To determine the voice-of-the associate, a survey can be prepared to determine what works, what doesn't work, what should be changed, and a positive and a negative that would impact the product or service or the use of it.

Process maps can be created to assist in characterizing the as-is process. Data can be collected from on-site interviews of the associates (employees) and directly used to build an overall as-is process map and other types of process maps. A spaghetti map can also be constructed that illustrates the environment of the as-is process. Additionally, causes and effects can be analyzed and described as part of the as-is process using such tools as a cause-and-effect fishbone diagram and a cause-and-effect matrix built from the fishbone. Additionally, waste can be described and characterized, and quantified based on observed timings and Muda costing.

An additional tool that can be used early in team sessions at block 204 of FIG. 2 is the "cost-of-poor-process-opportunity" (COPPO) tool, which captures and identifies the cost per process step. In example embodiments, this tool can be implemented with a Microsoft Excel™ spreadsheet running a visual basic macro. The same type of spreadsheet can be used later to identify future COPPO or the COPPO in the "to-be" process. The "as-is" and "to-be" COPPO results can be compared with a business case proof of concept tool to evaluate a business case for change.

Later, possibly in team sessions, the to-be process can be characterized as shown at block 206 of FIG. 2. Various tools such as a project prioritization by risk/reward and a baseline tree metric can be used along with process flows, some of which are updated from the analysis of the as-is process. For example, the VOA can be used, as well as an activity of the product analysis, an activity of the associate analysis, and an activity of the equipment analysis. Such analysis tools can include a process flows and time value maps. The activity of the equipment (AOE) analysis can include determining operating equipment efficiency and developing an associated efficiency log, and an AOE spaghetti map. One tool that can be used to determine a future or to-be state is an analysis to identify, and then convert or eliminate (ICE) waste. Sources of waste are analyzed, and financial analysis can be performed. A takt time calculator, which can also be referred to as a takt-o-meter or takt-o-meter tool, can be used to determine the pace of production needed to produce a unit to meet customer demand requirements at a level necessary to drive the to-be state or optimize the as-is state. Source code for an example embodiment of the takt-o-meter is listed in the appendix as the second block of code.

In the operating environment of the invention, as described by FIGS. 1 and 2, a new process design and product flow can be delineated, along with any exception flows necessitated. Standard work is described so that an associate can be trained. Strategies and assessments can be completed, and can include monument identification, and a so-called "5S" assessment, which focuses on workplace layout and cleanliness. In addition, as part of the to-be process characterization of FIG. 2, an operating efficiency analysis is done through an operating efficiency model providing complexity and skill level scenarios for various staffing and inventory levels against a primary metric that is variable by engagement. One example of the operating efficiency model is implemented via a spreadsheet running a visual basic script. Example visual basic source code is included in the appendix, and is listed third.

Material inputs for the business process can be identified along with an internal replenishment plan or "Kanban" strategy. Perishable supplies can also be described and supported with Kanban calculations. Cost analysis can be performed for the to-be process, and the business case can be evaluated using a proof of concept tool can be used to identify cost-per-step in the to-be process compared to costs in the former as-is process, the savings opportunity, and the initiatives needed to capture the opportunity in the new process. The COPPO tool and the comparative evaluation of the various tasks or steps in the process that it provides can be instrumental in developing this business case. Another tool, a critical-to-business results analysis can be used to compare the business value determined for each initiative coming out of the to-be process against its ease of implementation. The business case proof of concept tool can be implemented as a spreadsheet running a visual basic script. An operational risk assessment can be done to assess potential risk for the proposed initiatives. Source code for visual basic macros to provide a COPPO spreadsheet for both the as-is and to-be processes and the business case evaluation in tabs (along with other tools) is contained in the appendix and is listed first. An example COPPO business case tool is also described in more detail below with reference to FIGS. 3-5 of this disclosure.

As shown at block 208 of FIG. 2, a deployment/implementation and control plan can be created and executed after the as-is and to-be processes or "states" have been characterized and analyzed. Final metrics are defined and linked to the initiatives being piloted. A final operating efficiency matrix can also be used to model pilot results. A plan for visually displaying and updating these metrics is also put in place. New roles and responsibilities are defined, standard work definitions are developed and a scheduling system can be refined and/or created. A final or additional to-be takt and staffing calculation can be performed and institutionalized. Typically, ongoing training and support plans are also put in place. As part of the control plan, the multi-generational plan previously discussed can be updated or created. In addition a "Kaizen" strategy, audit routine, and workflow policies and procedures can be created and implemented. After the above is completed the new process is fully implemented and results including lessons learned are captured. A plan can then be put in place to transition to a new process, possibly including new or newly certified personnel.

Figures 3, 3B:
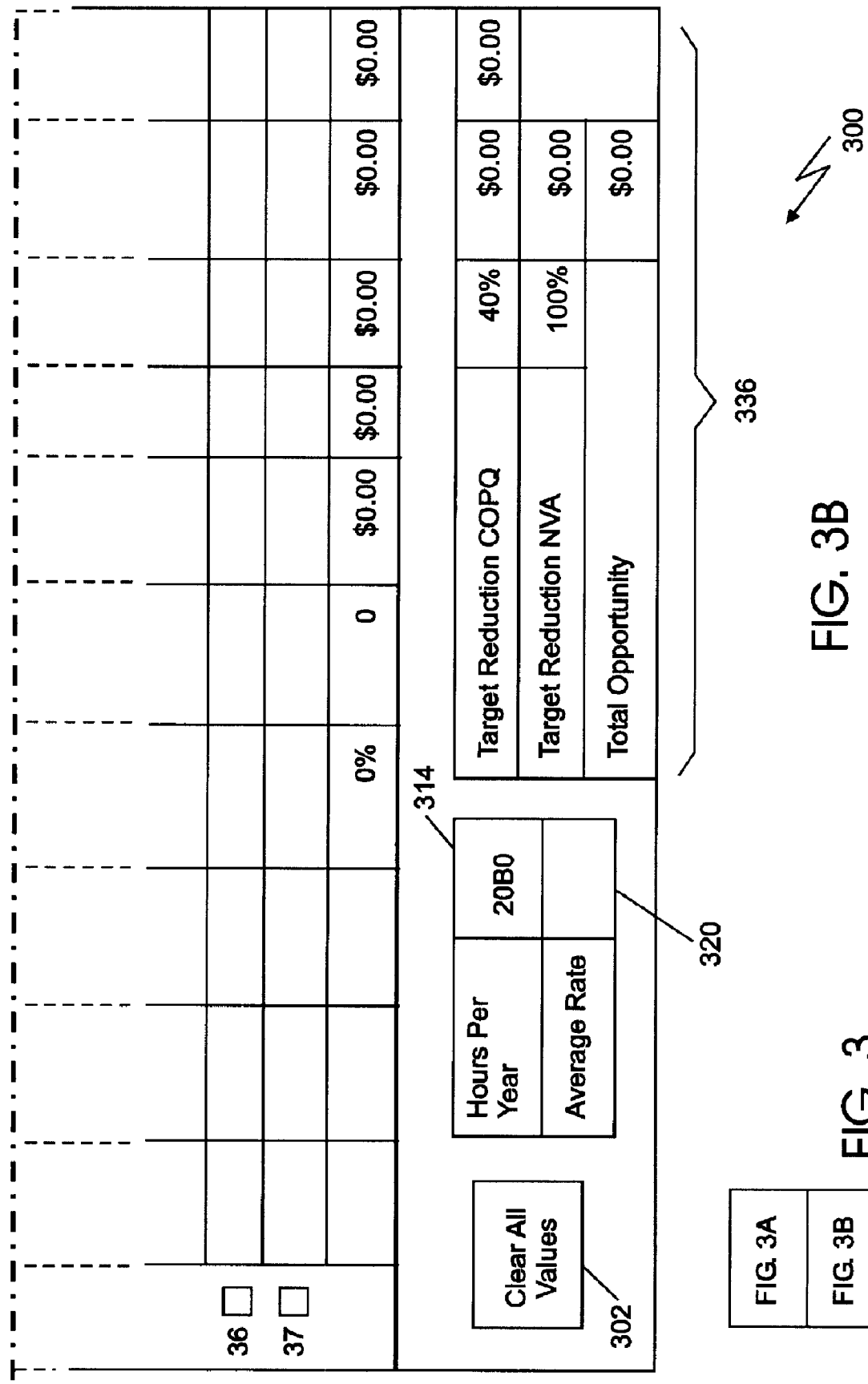

FIG. 3 is a screenshot, 300, of a tool that can be used to calculate COPPO according to example embodiments of the invention. FIG. 3 is presented as FIGS. 3A and 3B. The spreadsheet implementation of the tool, as illustrated in FIG. 3, is for the "as-is" COPPO, however, the "to-be" COPPO can be calculated by using another, similar sheet. The appendix to this application includes visual basic source code for a spreadsheet implementation of such an embodiment. A walk-through of screenshot 300 of FIG. 3 provides a good vehicle to explain how COPPO and other information can be determined for a plurality of steps or tasks in an activity.

Button 302 in the lower left hand clears all previous inputs, and lets the user start with a new calculation. Field 304 can be filled in with a process description and field 306 can be filled in with the name of the person completing the model. The model is built from a description of the steps of the people working in the activity based on their individual performance within process. A process map, flowchart or physical description of the process can be used. Each task of that description can be isolated and can become one of the steps. The steps are listed in column 308 of screenshot 300 of FIG. 3. The number of steps/tasks can be determined by describing the process, for example, using an interviewing technique.

Check boxes 310 are used to indicate whether a step is value-added, meaning that the step produces something of value to a customer of the process. In at least some embodiments, value-added steps can be considered those steps for which a customer of the process or activity will pay.

Column 312 of screenshot 300 is for the input of "FTE by step" for each of the steps in the activity. To determine FTE by step, the number of full time equivalent employees performing that step over the period of the year, or comparable accounting period is determined. That total can be divided by the total number of minutes being utilized by a single FTE, to obtain the FTE by step. For activities that take a small amount of time, the FTE by step is generally a fractional number, unless there are a large number of employees (associates) working on the activity.

It should be noted that the step names, FTE by step, and the other descriptive information mentioned so far with respect to FIG. 3 are, in at least some embodiments, the only information which is input to the COPPO tool by a normal user. In such an embodiment, other fields can be pre-populated by a person who supervises the COPPO process, or are calculated, as can be readily appreciated by a person who examines the appendix.

Still referring to FIG. 3, the total number of FTE per step accumulates at the bottom of the column and equates to the total number of FTE allocated to that particular business entity performing that process or activity, taking into account the standard number of hours worked a year by a full time employee. In this example embodiment, that number of hours is shown in field 314, and is 2080 hours per year.

Column 316 of FIG. 3 shows the average hours per task, which is the result of the number of FTE employees times the time spent doing a particular process step. That column should cumulatively total to the average hours per year, in this example 2080 hours. Column 318 is the average rate for an employee performing the task. If an overall average rate is input in block 320, that value is used. However, in processes where employees of different rates are used for different tasks, the appropriate blocks in the model can be adjusted when deemed necessary. Time leveled column 322 takes the individual activities and apportions them across 100%. This apportionment can provide a perspective of which particular activities are absorbing the most time in the process. Additionally, in this example embodiment, time leveling force balances to 2080 hours.

Column 324 of screenshot 300 of FIG. 3 lists the FTE cost per step, which refers to the total amount of cost for the FTE that is applied to that process step. In this example embodiment, that value is the number of FTE employees times the average hours per task times the average fully burdened rate. Fixed costs like occupancy and telecommunications are not usually assigned per individual but are assigned to an entity enterprise; however, these costs could be included in the burdened rate if desired.

Still referring to FIG. 3, column 326, labeled "NVA" refers to the portion of the activity cost in each case that is non-value added. Those tasks that are checked at boxes 310 have value added direct cost. In this example embodiment, if a task is not checked, the task is deemed "non-value added," and 100% of the cost in that process step will also be non-value added. In such a case the FTE cost per step is the same as the non-value added cost. Column 328 shows the cost of poor quality (COPQ) target percentage for each task, which refers to the particular component of cost in a value-added activity, which in fact is non-value added. If one delineates each value-added process step, and breaks it down to a lower level, one would find that it usually has multiple steps within it, some of which add value, and some of which add no value. In general a percentage between 20% and 40% is allocated to this non-value added component of the identified value-added step or task. It should be noted that 40% has been found to be a good benchmark for COPQ. Thus, in the case of a non-value-added step, the total cost of the task becomes the total cost of poor business process for the step in column 330. For a value-added step, the FTE cost per step is multiplied by the COPQ, in this example 40% as input at field 332, and the result is total cost of poor business process. These amounts again total at the bottom of the column. Note that the total cost for each task is calculated and shown in column 334. Also note that in the screenshot of FIG. 3, total opportunity costs and the total process cost for all activities are again summarized near the bottom right of the spreadsheet display in area 336.

FIG. 4 is a screenshot 400 of a spreadsheet presentation of a business case for a "to-be" process. This sheet is also generated by the source code of the appendix. In at least some embodiments of the invention, the COPPO or a similar analysis can be done for both an as-is process and a to-be process, and the results compared to show the business case for change. Column 402 lists the as-is process steps and column 404 is the cost per step from the COPPO spreadsheet. Column 406 and 408 present the steps and costs for the to-be analysis, which has not been separately shown, but is generated by the source code of the appendix. The difference in cost between the as-is process steps and the to-be process steps is displayed in column 410. All columns are totaled at the bottom of screen 400.

Still referring to FIG. 4, columns 412 provide a means to track the initiatives and/or improvements relative to as-is and to-be processes. A separate sheet, not shown here, can be provided for this purpose. Initiatives can be listed in the first column of this section as groups of initiatives. Each group can be assigned a new number in the next column. Finally, the amount of savings contributed by each initiative in the group of initiatives can be shown in the last column of this section. This last column is again totaled at the bottom of screen 400.

Figure 5:
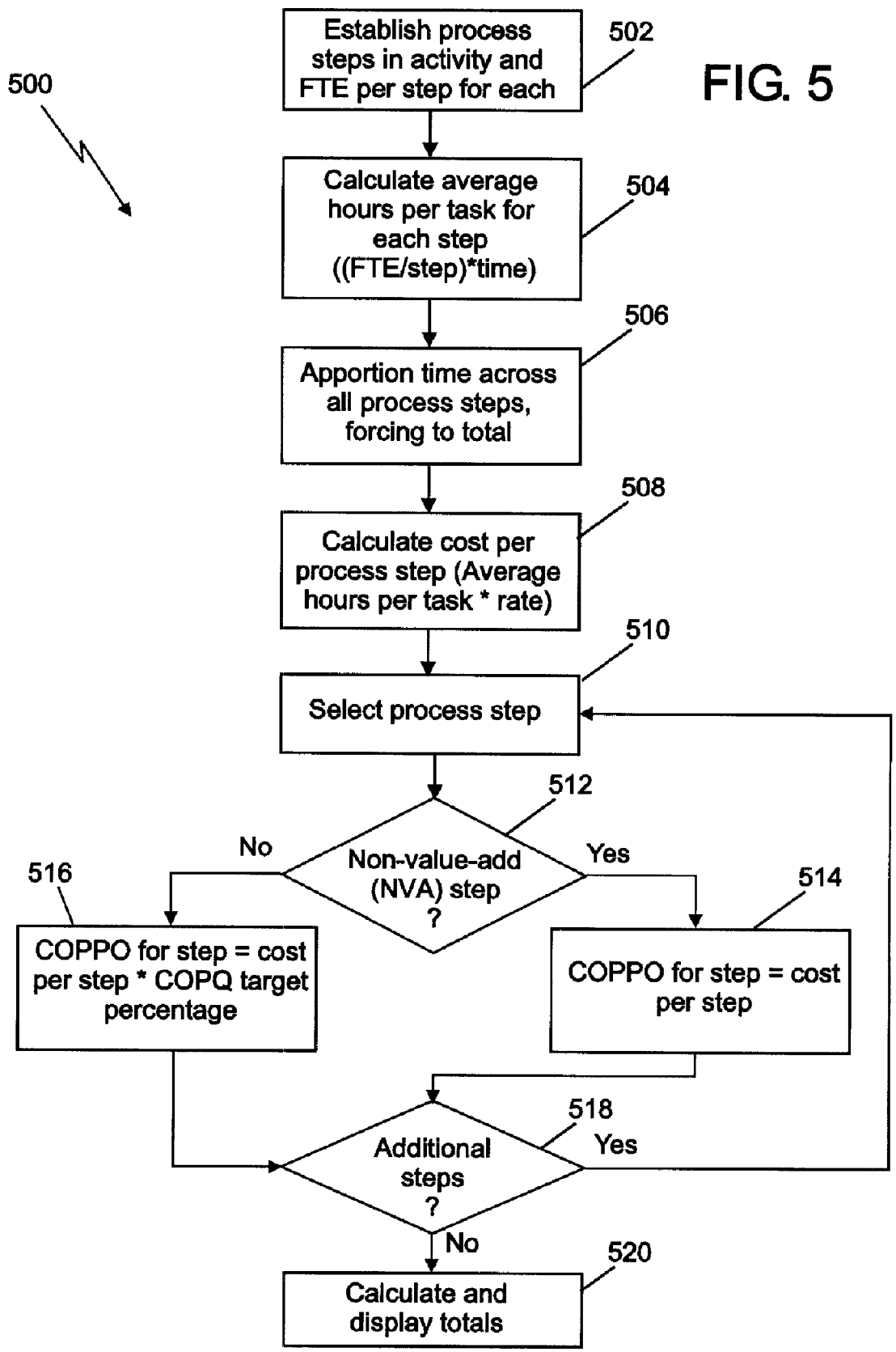
FIG. 5 is a flowchart showing some of the calculations performed in doing a COPPO evaluation according to at least some example embodiments of the present invention.

FIG. 5 shows the COPPO calculations of at least some embodiments of the present invention illustrated in flowchart form. Process 500 consists, in this example, of a series of sub-process blocks, as is typical of most flowchart illustrations. At block 502, the process steps or tasks in the activity being evaluated are established. In computerized implementations of process 500, this can be accomplished via user input, or by pulling the information from a data store. At block 504, the average hours per task is calculated by multiplying the number of full time equivalent employees on the step by the time taken. At block 506 in this embodiment, the time is apportioned across all steps, forcing the cumulative time to the total time allotted in an accounting period, for example, a calendar year. At block 508, the cost per process step is calculated by multiplying the average hours per task times the burdened rate for an FTE.

Still referring to FIG. 5, each process step is handled by independent calculations beginning at block 510. At block 512, a determination is made as to whether a step is a non-value-added (NVA) step. In at least some embodiments, this determination is made through user input. For example, in the embodiment shown in FIG. 3 and in the appendix, a step is treated as an NVA step when the user does not check the appropriate box. If a step is an NVA step, the COPPO for the step is set to the cost for the step at block 514. Otherwise, the COPPO for the step is set to the cost per step times the COPQ target percentage at block 516. If there are additional steps at block 518, the NVA determination and calculation is repeated. Totals are calculated and displayed at block 520. Although this totaling appears graphically after the other process blocks in FIG. 5, it actually occurs continuously in the example embodiments presented herein.

Figure 6:
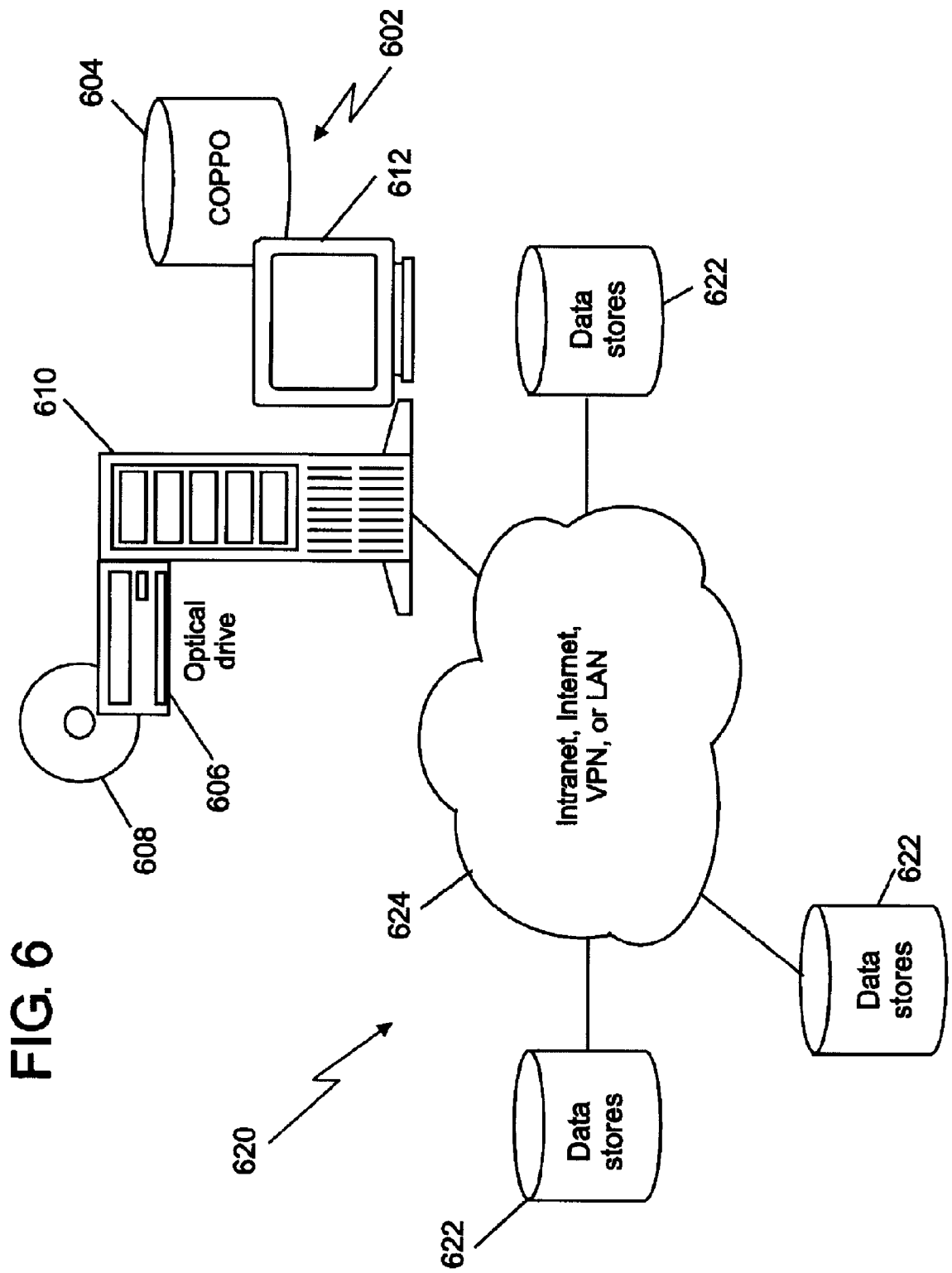
FIG. 6 is a system block diagram according to example embodiments of the invention.

FIG. 6 illustrates a typical operating environment for embodiments of the present invention. FIG. 6 actually illustrates two alternative embodiments of a system implementing the invention. System 602 can be a workstation or personal computer. System 602 can be operated in a "stand-alone" mode. The system includes a fixed storage medium, illustrated graphically at 604, for storing programs and/or macros which enable the use of an embodiment of the invention. In a stand-alone implementation of the invention, fixed storage 604 can also include saved output data and input data such as time and cost figures. In this particular example, an optical drive, 606, is connected to the computing platform for loading the appropriate computer program product into system 602 from an optical disk, 608. The computer program product includes a computer program or programs with instructions or code for carrying out the methods of the invention. Instruction execution platform 610 of FIG. 6 can execute the appropriate instructions and display appropriate screens on display device 612. These screens can include the user input screen previously discussed.

FIG. 6 also illustrates another embodiment of the invention in which case the system 620, which is implementing the invention includes a connection to data stores 622, from which input data and the like can be read, and to which output data such as results can be saved for future reference. The connection to the data stores or appropriate databases can be formed in part by network 624, which can be an intranet, virtual private network (VPN) connection, local area network (LAN) connection, or any other type of network resources, including the Internet.

A computer program which implements all or parts of the invention through the use of systems like those illustrated in FIG. 6 can take the form of a computer program product residing on a computer usable or computer readable storage medium. Such a computer program can be an entire application to perform all of the tasks necessary to carry out the invention, or it can be a macro or plug-in which works with an existing general purpose application such as a spreadsheet or database program. Note that the "medium" may also be a stream of information being retrieved when a processing platform or execution system downloads the computer program instructions through the Internet or any other type of network. Computer program instructions which implement the invention can reside on or in any medium that can contain, store, communicate, propagate or transport the program for use by or in connection with any instruction execution system, apparatus, or device. Such a medium may be, for example, but is not limited to, an electronic, magnetic, optical, electromagnetic, or semiconductor system, apparatus, device, or network. Note that the computer usable or computer readable medium could even be paper or another suitable medium upon which the program is printed, as the program can then be electronically captured from the paper and then compiled, interpreted, or otherwise processed in a suitable manner.

Specific embodiments of an invention are described herein. One of ordinary skill in the computing and process management arts will recognize that the invention can be applied in other environments and in other ways. It should also be understood that an implementation of the invention can include features and elements or steps in addition to those described and claimed herein. Thus, the following claims are not intended to limit the scope of the invention to the specific embodiments described herein.

What is claimed is:

1. A computer-implemented method of evaluation of a cost of poor process opportunity (COPPO) for a plurality of steps of an activity, the method comprising:
calculating a cost per step, through the use of a processor, for each of the plurality of steps based at least in part on an average time per task and a full time equivalent (FTE) rate, wherein the average time per task is calculated by multiplying a FTE by step value for each step by the average time of the FTE, wherein the FTE by step value for each step is the number of FTEs performing the step per a time period, wherein the FTE rate is an average rate for a group of FTEs associated with each of the plurality of steps, wherein the FTE rate includes fixed costs associated with the group of FTEs associated with each of the plurality of steps, wherein the group of FTEs associated with each of the plurality of steps are employees that are used for each of the plurality of steps within the activity, and wherein the cost per step equals the average time per task multiplied by the FTE rate;
determining, through the use of the processor, for each of the plurality of steps, whether a step is a non-value-add step;
setting, through the use of the processor, a COPPO for the step equal to the cost per step when the step is a non-value-add step;
setting, through the use of the processor, the COPPO for the step equal to the cost per step multiplied by a cost of poor quality (COPQ) target percentage when the step is not a non-value-add step;
calculating a total cost of poor business process, through the use of the processor, by summing the COPPO for each of the steps in the activity; and
displaying, through the use of the processer, the total cost of poor business process relative to a total cost for each of the plurality of steps, wherein the total cost of poor business process and the total cost for each of the plurality of steps are displayed as the non-value added cost.

2. The method of claim 1 further comprising calculating and displaying a total activity cost of poor business process relative to a total activity cost.

3. The method of claim 2 wherein the COPQ target percentage is at least 20 percent but not more than 40 percent.

4. The method of claim 1 wherein the calculating a cost per step for each of the plurality of steps further comprises apportioning time available during an accounting period across all process steps.

5. The method of claim 4 wherein the COPQ target percentage is between at least 20 percent but not more than 40 percent.

6. The method of claim 1 further comprising:
producing a business case for a to-be process by determining at least one of a total to-be cost of poor business process for at least one of the plurality of steps, a total to-be cost per step for at least one of the plurality of steps, a total to-be activity cost of poor business process, and a total to-be activity cost.

7. The method of claim 2 further comprising:
producing a business case for a to-be process by determining at least one of a total to-be cost of poor business process for at least one of the plurality of steps, a total to-be cost per step for at least one of the plurality of steps, the total to-be activity cost of poor business process, and the total to-be activity cost.

8. The method of claim 3 further comprising:
producing a business case for a to-be process by determining at least one of a total to-be cost of poor business process for at least one of the plurality of steps, a total to-be cost per step for at least one of the plurality of steps, the total to-be activity cost of poor business process, and the total to-be activity cost.

9. A computer program product for evaluation of a cost of poor process opportunity (COPPO) for a plurality of steps of an activity, the computer program product comprising at least one non-transitory computer-readable medium having computer-readable program code portions embodied therein, the computer-readable program code portions comprising:
an executable portion configured for calculating a cost per step for each of the plurality of steps based at least in part on an average time per task and a full time equivalent (FTE) rate, wherein the average time per task is calculated by multiplying a FTE by step value for each step by the average time of the FTE, wherein the FTE by step value for each step is the number of FTEs performing the step per a time period, wherein the FTE rate is an average rate for a group of FTEs associated with each of the plurality of steps, wherein the FTE rate includes fixed costs associated with the group of FTEs associated with each of the plurality of steps, wherein the group of FTEs associated with each of the plurality of steps are employees that are used for each of the plurality of steps within the activity, and wherein the cost per step equals the average time per task multiplied by the FTE rate;
an executable portion configured for identifying, for each of the plurality of steps, whether a step is a non-value-add step;
an executable portion configured for identifying a COPPO for the step is equal to the cost per step when the step is a non-value-add step;
an executable portion configured for identifying the COPPO for the step is equal to the cost per step multiplied by a cost of poor quality (COPQ) target percentage when the step is not a non-value-add step;
an executable portion configured for calculating a total cost of poor business process, through the use of the processor, by summing the COPPO for each of the steps in the activity; and
an executable portion configured for displaying a total cost of poor business process relative to a total cost for each of the plurality of steps, wherein the total cost of poor business process and the total cost for each of the plurality of steps are displayed as a function of the associated non-value added cost.

10. The computer program product of claim 9 further comprising:
an executable portion configured for calculating and displaying a total activity cost of poor business process relative to a total activity cost.

11. The computer program product of claim 9, wherein the executable portion configured for calculating a cost per step for each of the plurality of steps further comprises apportioning time available during an accounting period across all process steps.

* * * * *